United States Patent
Mori

(10) Patent No.: US 12,269,550 B2
(45) Date of Patent: Apr. 8, 2025

(54) REAR FENDER STRUCTURE OF A SADDLE-RIDE VEHICLE

(71) Applicant: HONDA MOTOR CO., LTD., Tokyo (JP)

(72) Inventor: Hiroki Mori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 329 days.

(21) Appl. No.: 17/950,280

(22) Filed: Sep. 22, 2022

(65) Prior Publication Data

US 2023/0108243 A1  Apr. 6, 2023

(30) Foreign Application Priority Data

Sep. 30, 2021 (JP) .................................. 2021-162133

(51) Int. Cl.
| | |
|---|---|
| B60K 1/04 | (2019.01) |
| B62J 15/00 | (2006.01) |
| B62J 17/00 | (2020.01) |
| B62K 11/02 | (2006.01) |

(52) U.S. Cl.
CPC ............... B62J 15/00 (2013.01); B62J 17/00 (2013.01); B62K 11/02 (2013.01)

(58) Field of Classification Search
CPC ....................................................... B62J 15/00
See application file for complete search history.

(56) References Cited

U.S. PATENT DOCUMENTS

| | | | | |
|---|---|---|---|---|
| 6,318,743 | B1 * | 11/2001 | Nakashima ............ | B62K 11/04 180/219 |
| 2009/0114466 | A1 | 5/2009 | Nishijima et al. | |
| 2014/0062058 | A1 | 3/2014 | Tsutsui et al. | |

FOREIGN PATENT DOCUMENTS

| | | |
|---|---|---|
| JP | S62-198575 A | 9/1987 |
| JP | H07-069260 A | 3/1995 |
| JP | H08-026163 A | 1/1996 |
| JP | 2001-071961 A | 3/2001 |
| JP | 2003-205875 A | 7/2003 |
| JP | 2009-113557 A | 5/2009 |
| JP | 2012-025286 A | 2/2012 |
| JP | 2014-046858 A | 3/2014 |
| JP | 2015-085743 A | 5/2015 |

OTHER PUBLICATIONS

Japanese Office Action dated Jun. 6, 2023, Japanese Application 2021162133, English translation included, 7 pages.

* cited by examiner

*Primary Examiner* — Jason D Shanske
*Assistant Examiner* — James J Triggs
(74) *Attorney, Agent, or Firm* — Rankin, Hill & Clark LLP

(57) ABSTRACT

A saddle-ride vehicle includes: left and right seat rails; left and right sub-frames; and a rear fender assembled from a lower side. The rear fender has a base portion and left and right vertical wall portions. The base portion forms a housing space for vehicle body components. Separation distance of the left and right vertical wall portions is smaller than separation distance of the left and right sub-frames. At upper parts of the left and right vertical wall portions each are provided with an eaves portion extending outward in a vehicle width direction to fill a gap between the vertical wall portion and the frames. The eaves portions overlap with the seat rails in an up-down direction, and the eaves portions each have a guide portion.

7 Claims, 14 Drawing Sheets

REAR FENDER STRUCTURE OF A SADDLE-RIDE VEHICLE

INCORPORATION BY REFERENCE

The present application claims priority under 35 U.S.C. § 119 to Japanese Patent Application No. 2021-162133 filed on Sep. 30, 2021. The content of the application is incorporated herein by reference in its entirety.

BACKGROUND OF THE INVENTION

Field of the Invention

The present invention relates to a saddle-ride vehicle.

Description of the Related Art

Conventionally, in saddle-ride vehicles, a configuration is known in which a saddle-ride vehicle has a pair of left and right seat rails and a pair of left and right sub-frames for supporting the seat rails, and a rear fender is assembled from the lower side of a vehicle body (See, for example, Japanese Patent Laid-Open No. 2003-205875). In Japanese Patent Laid-Open No. 2003-205875, the rear fender has a base portion located on an upper side of a rear wheel and vertical wall portions extending upward from the base portion, and the upper surface of the base portion serves as a housing space for vehicle body components. In Japanese Patent Laid-Open No. 2003-205875, the left and right vertical wall portions are provided to fit any one pair of the seat rails and the sub-frames that have a smaller left and right separation distance. This allows the rear fender to be assembled from the lower side.

However, when the vertical wall portions are provided to fit the frame members having a smaller separation distance among the seat rails and sub-frames, the vertical wall portions create gaps with the other frame members having a larger separation distance. Further, when the vertical wall portions are exposed in appearance, the gaps created with the frame members are likely to affect appearance, and need a measure to prevent water from entering at the time of car washing.

An object of the present invention, which has been made in view of the above circumstances, is to provide a saddle-ride vehicle capable of improving appearance and waterproof property when vertical wall portions of a rear fender each have a gap with a seat rail or a sub-frame.

SUMMARY OF THE INVENTION

A saddle-ride vehicle includes: a pair of left and right seat rails; a pair of left and right sub-frames for respectively supporting the pair of left and right seat rails; and a rear fender assembled from a lower side of a vehicle body, the rear fender including a base portion located on an upper side of a rear wheel, the rear fender having a pair of left and right vertical wall portions extending upward from the base portion, an upper surface of the base portion forming a housing space for vehicle body components, wherein a separation distance of the pair of left and right vertical wall portions is set smaller than a separation distance of the pair of left and right sub-frames, and upper parts of the pair of left and right vertical wall portions are each provided with an eaves portion, extending outward in a vehicle width direction, for filling a gap between each of the vertical wall portions and each of the frames, the eaves portions overlap with the seat rails in an up-down direction, and upper surfaces of the eaves portions each have a guide portion whose height decreases outward in the vehicle width direction.

The Effect of the Invention

It is possible to provide a saddle-ride vehicle capable of improving appearance and waterproof property when vertical wall portions of a rear fender each have a gap with a seat rail or a sub-frame.

DETAILED DESCRIPTION OF THE PREFERRED EMBODIMENTS

Figure 1:
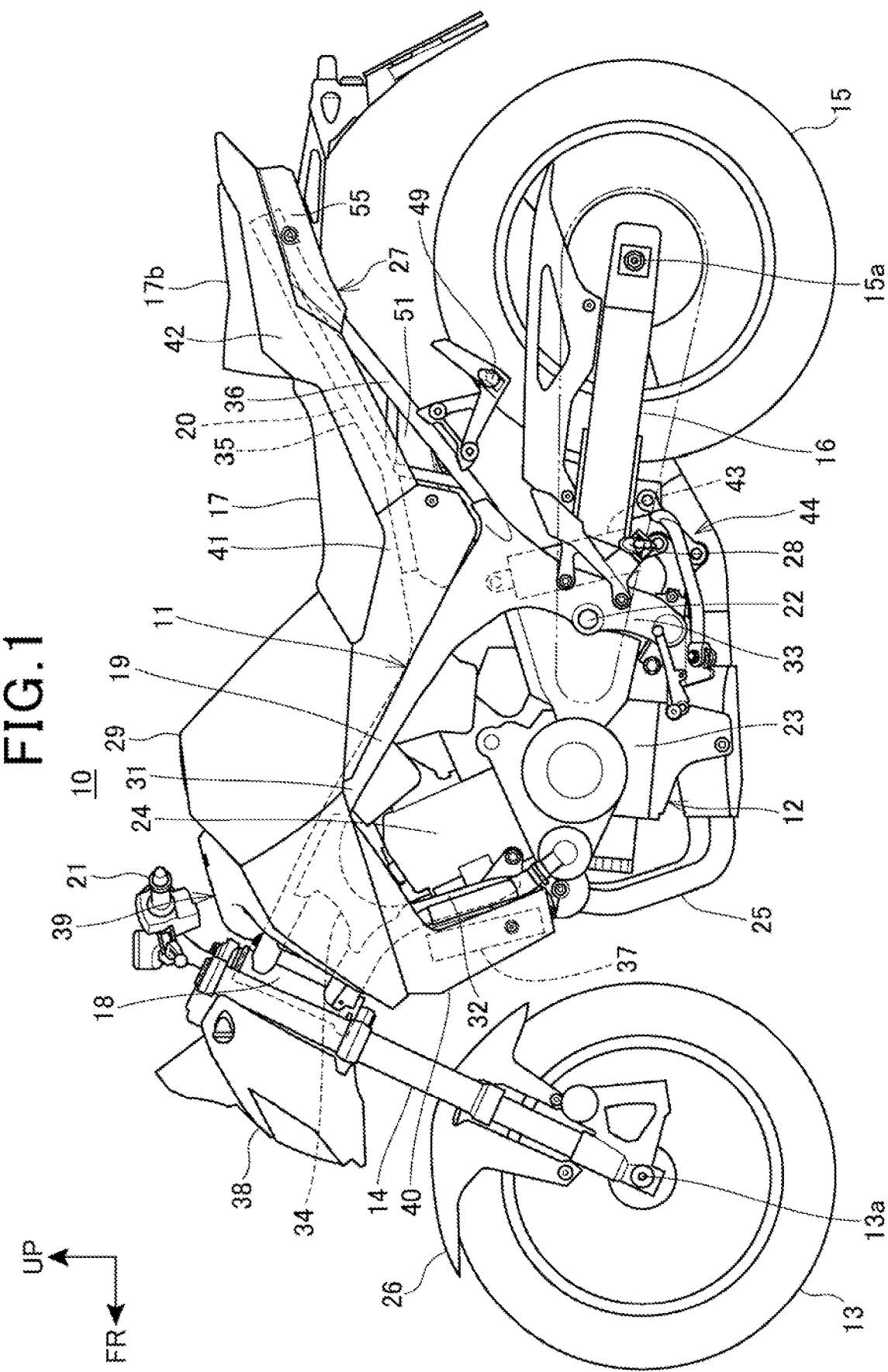
FIG. 1 is a side view of a saddle-ride vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

A front frame 19 includes: a pair of left and right main frames 31 extending rearward and downward from the upper part of the head pipe 18; a pair of left and right down frames 32 extending rearward and downward from the lower part of the head pipe 18; a pair of left and right pivot frames 33 extending downward from a rear end portion of the main frame 31; and a pair of gusset 34 each connecting the down frame 32 and the main frame 31 on the rear side of the head pipe 18.

The rear frame 20 includes: a pair of left and right seat frames (seat rails) 35 extending rearward and upward from the rear end portion of the main frame 31; and a pair of left and right sub-frames 36 that extend rearward and upward from the upper end portions of the pivot frames 33 and that are connected to the rear end portion of the seat frames 35.

The power unit 12 is disposed on the lower side of the main frames 31 between the down frames 32 and the pivot frames 33, and is supported by the front frame 19. The power unit 12 is an engine. The cylinder 24 extends upward from the upper surface of the front part of the crankcase 23.

The fuel tank 29 is disposed on the upper side of the main frame 31 between the seat 17 and the head pipe 18 in the vehicle front-rear direction. The fuel tank 29 is supported on the main frame 31.

The radiator 37 through which the cooling water of the power unit 12 passes is disposed on the front side of the cylinder 24 and the down frame 32. The radiator 37 has a plate shape, and is disposed so that the plate thickness direction is directed to the vehicle front-rear direction. The radiator 37 dissipates heat from the cooling water by wind passing back and forth through the radiator 37.

The saddle-ride vehicle 10 includes: a front cover 38 covering the head pipe 18 from the front side as a vehicle body cover covering the vehicle body such as the vehicle body frame 11; a tank cover 39 covering the fuel tank 29 from the front side; a pair of left and right radiator shrouds 40 covering the radiator 37 from the outside in the vehicle width direction; a pair of left and right side covers 41 covering the vehicle body on the front lower side of the seat 17 from the outside in the vehicle width direction; and a pair of left and right rear side covers (cover members) 42 covering the vehicle body on the lower side of the seat 17 at the rear part of the side cover 41, from the outside in the vehicle width direction.

Figure 2:
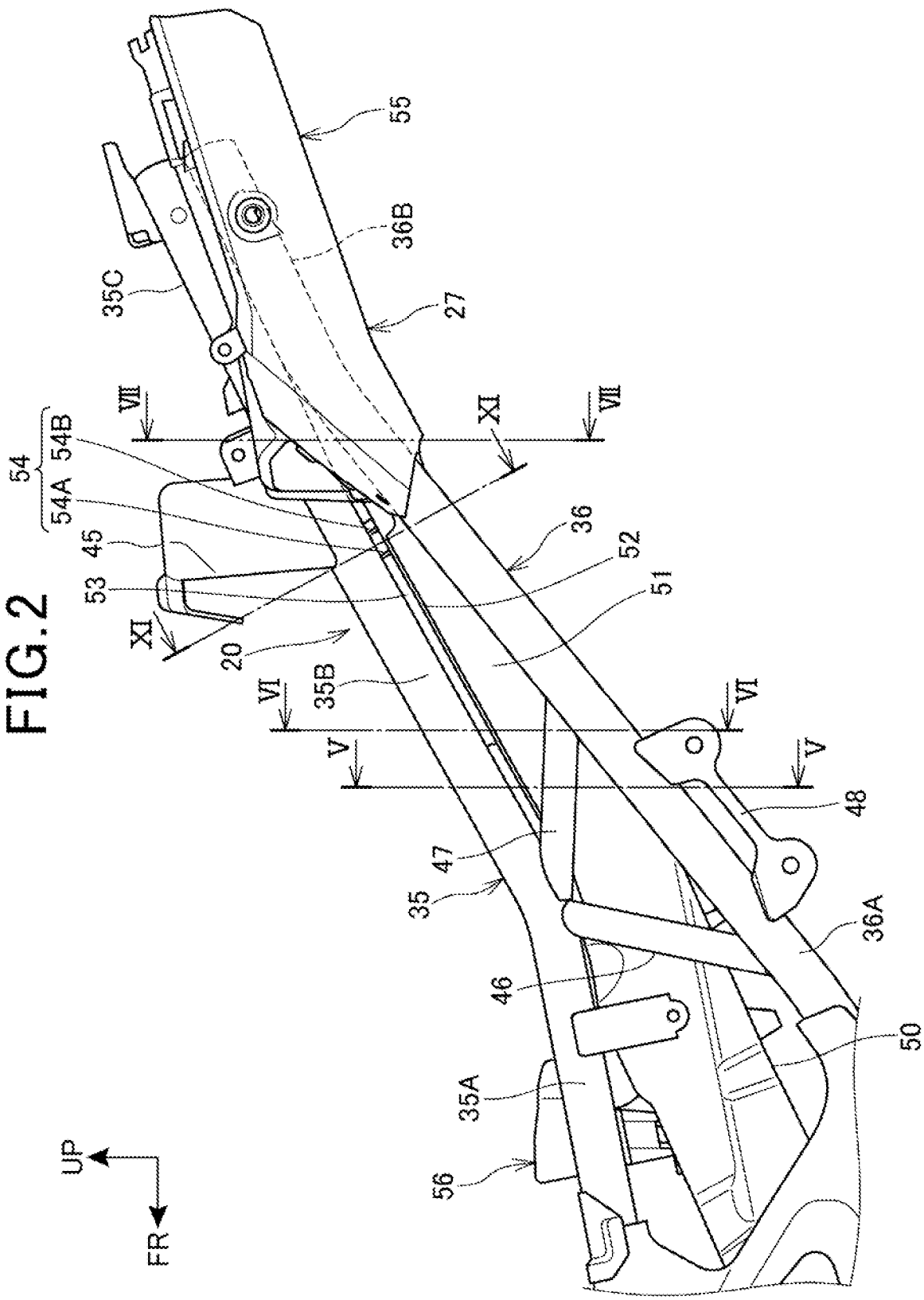
FIG. 2 is a left side view showing a positional relationship between a rear frame and a rear fender.

FIG. 2 is a left side view showing a positional relationship between the rear frame 20 and the rear fender 27.

The rear frame 20 and the rear fender 27 extend rearward and upward.

Each of the seat frames 35 of the rear frame 20 has a front end portion 35A connected to the rear part of the main frame 31. The front end portion 35A extends rearward and upward. On the rear side of the front end portion 35A, there is formed an intermediate portion 35B extending rearward and upward at a steeper angle than the front end portion 35A. On the rear side of the intermediate portion 35B, there is formed a rear end portion 35C extending rearward and upward with the same inclination as the intermediate portion 35B.

Figure 3:
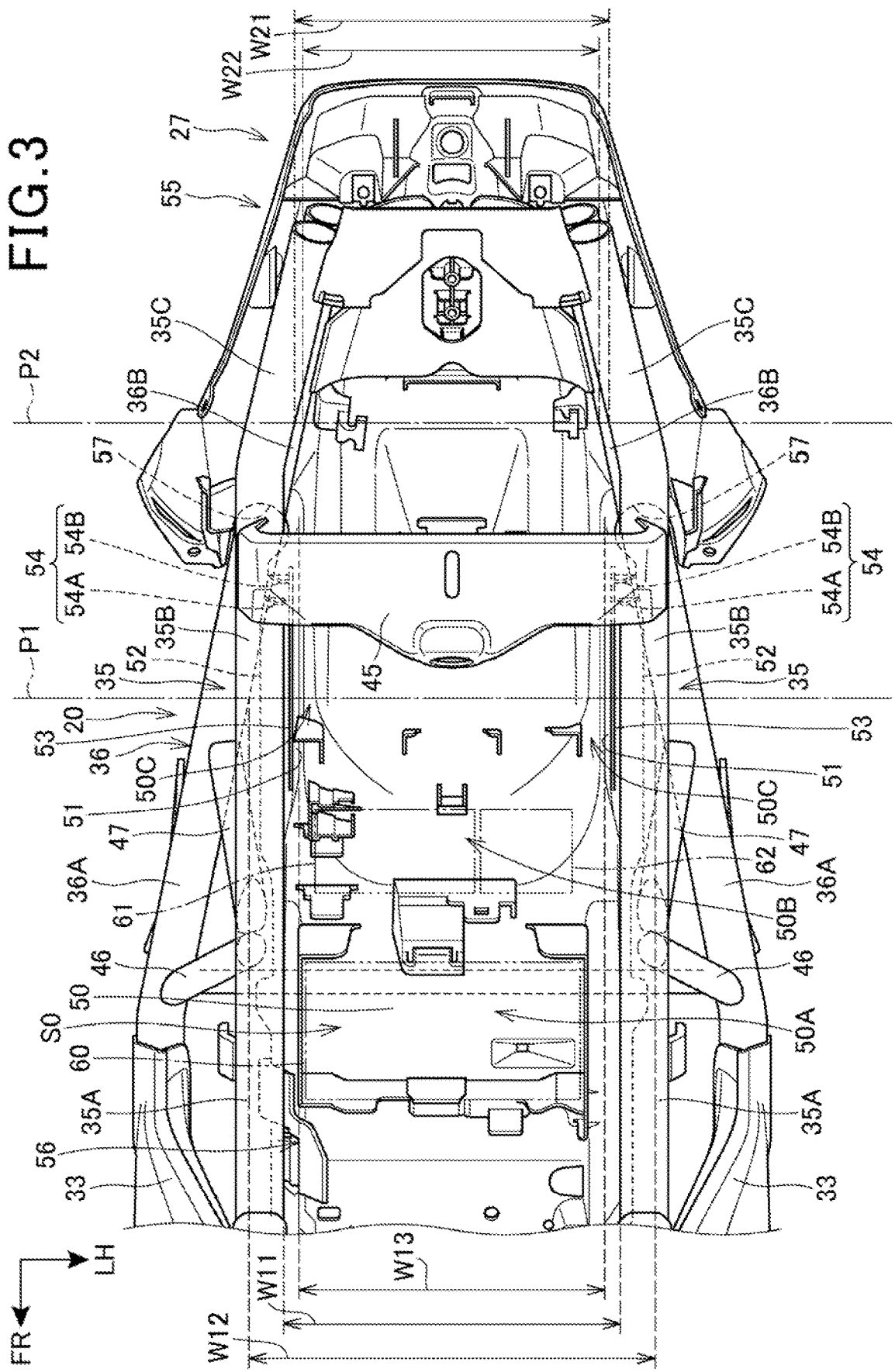
FIG. 3 is a plan view showing a positional relationship between the rear frame and the rear fender.

FIG. 3 is a plan view showing the positional relationship between the rear frame 20 and the rear fender 27.

In a plan view, the front end portions 35A and the intermediate portions 35B of the seat frames 35 extend linearly in the front-rear direction. The rear end portions 35C of the seat frames 35 are inclined inward in the vehicle width direction (left-right direction) toward the rear side.

A bridge portion 45 extending in the left and right is supported at the rear ends of the left and right intermediate portions 35B. The bridge portion 45 protrudes upward with respect to the seat frames 35 (see FIG. 2). On the upper side of the bridge portion 45, there is located the rear part of the seat 17 (see FIG. 1), which is the passenger seat 17b (see FIG. 1).

As shown in FIG. 2, each of the sub-frames 36 of the rear frame 20 has a front portion 36A extending linearly from the pivot frame 33 toward the rear end portion 35C of the seat frame 35. The front portion 36A extends rearward and upward with a steeper inclination than the seat frame 35. On the rear side of the front portion 36A, there is formed a rear end portion 36B extending rearward along the rear end portion 35C of the seat frame 35. The rear end portion 36B extends rearward on the lower side of the seat frame 35.

As shown in FIG. 3, in a plan view, the front portion 36A of each of the sub-frames 36 extends linearly from the outside in the vehicle width direction with respect to the seat frame 35, and inclines inward in the vehicle width direction toward the rear side. The front portion 36A of the sub-frame 36 overlaps the rear part of the intermediate portion 35B of the seat frame 35. The rear end portion 36B of the sub-frame 36 extends rearward in a state of being located inside the rear end portion 35C of the seat frame 35 in the vehicle width direction.

In the front side of the bridge portion 45, at the same position in the front-rear direction, for example, at the position P1 of the intermediate portions 35B of the seat frames 35, the separation distance W12 in the vehicle width direction of the pair of left and right sub-frames 36 is larger than the separation distance W11 in the vehicle width direction of the pair of left and right seat frames 35.

Further, in the rear side of the bridge portion 45, at the same position P2 in the front-rear direction, the separation distance W22 in the vehicle width direction of the pair of left and right sub-frames 36 is smaller than the separation distance W21 in the vehicle width direction of the pair of left and right seat frames 35. Therefore, the pair of left and right sub-frames 36 have a part in which separation distance including W12 and W22 is smaller than separation distance including W11 and W21 of the pair of left and right seat frames 35.

Each of the seat frames 35 and each of the sub-frames 36 form a truss structure. Specifically, the seat frame 35 and the sub-frame 36 are connected by a front side connection frame 46 and a rear side connection frame 47. The front side connection frame 46 extends rearward and upward from the sub-frame 36 and is connected to the rear end of the front end portion 35A of the seat frame 35. The rear side connection frame 47 extends rearward and downward from the front end of the intermediate portion 35B of the seat frame 35 and is connected to the sub-frame 36. The sub-frame 36 is provided with a bracket 48 between the front side connection frame 46 and the rear side connection frame 47. The bracket 48 is provided with a passenger footrest 49 via a footrest holder (see FIG. 1).

Figure 4:
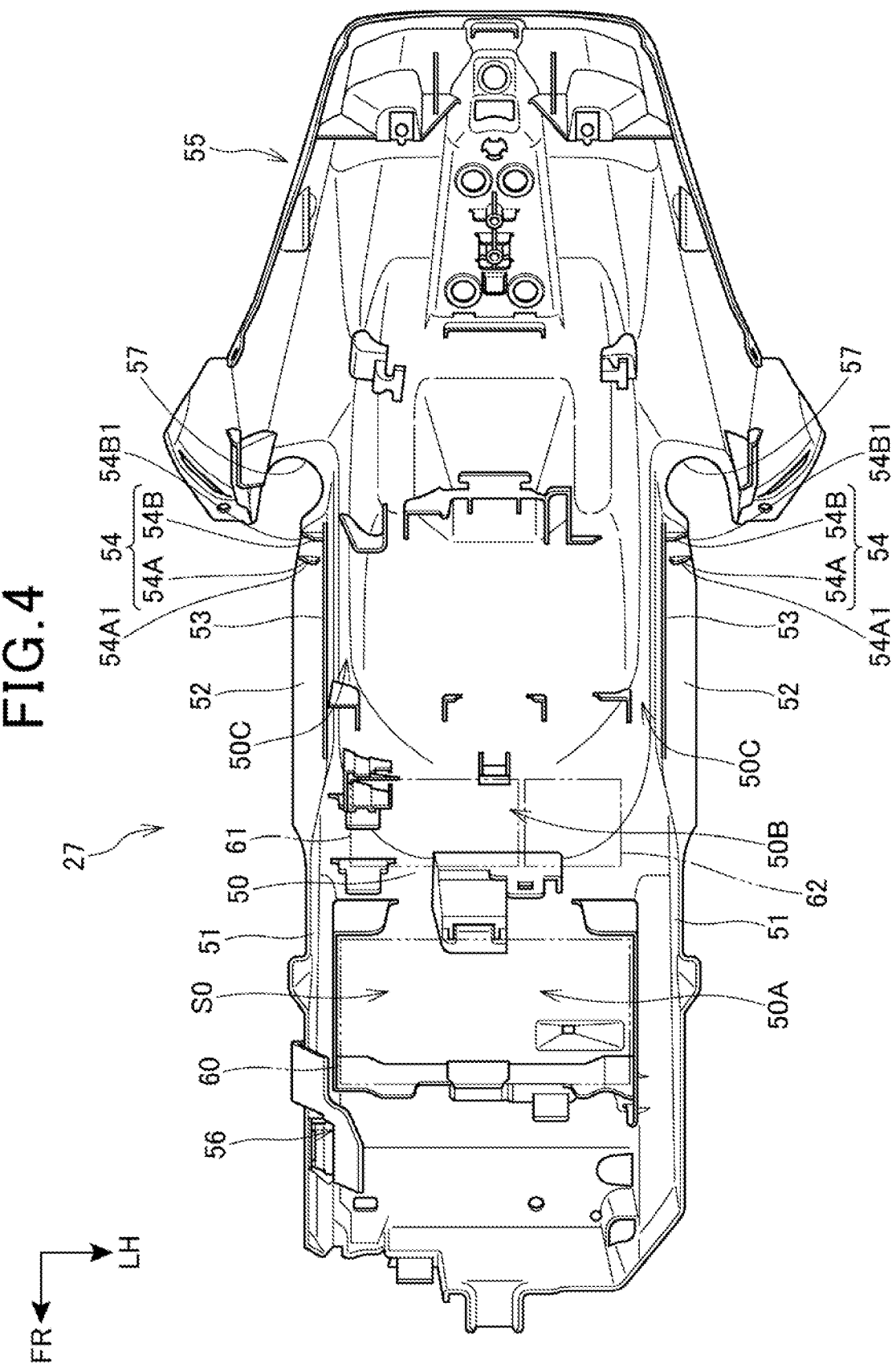
FIG. 4 is a plan view of the rear fender.

FIG. 4 is a plan view of the rear fender 27.

As shown in FIGS. 2 to 4, the rear fender 27 is assembled between: the seat frame 35 and the sub-frame 36 on the left side; and the seat frame 35 and the sub-frame 36 on the right side. The rear fender 27 is assembled from the lower side of the seat frames 35 and the sub-frames 36.

The rear fender 27 has a tray-shaped base portion 50 located on the upper side of the rear wheel 15. The base portion 50 extends in the front-rear direction. The base portion 50 extends along the lower side of the seat 17. The base portion 50 extends rearward along the rear frame 20 from the rear end of the fuel tank 29 (see FIGS. 1 and 9).

Figure 5:
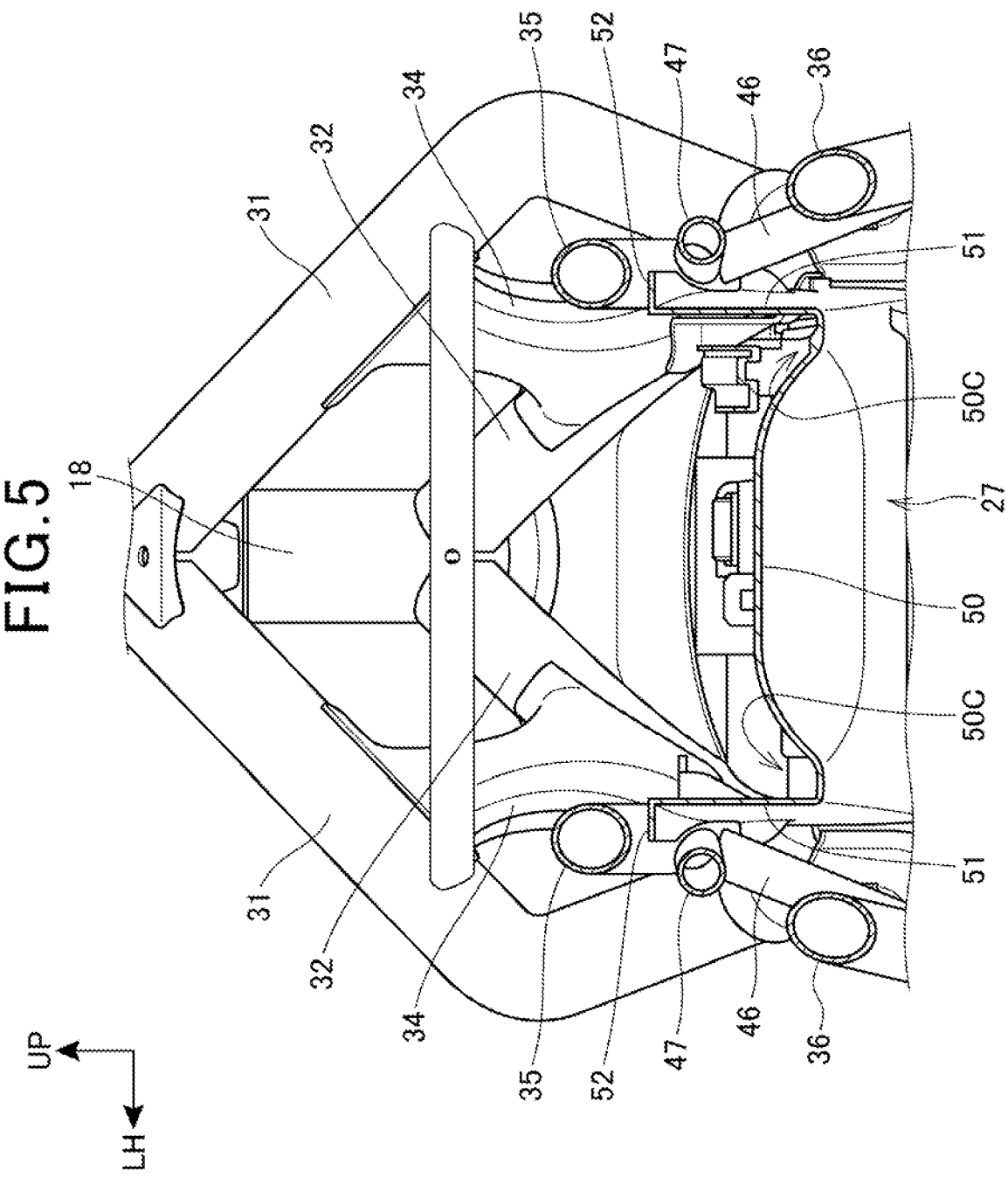
FIG. 5 is a cross-sectional view taken along a line V-V of FIG. 2.
Figure 6:
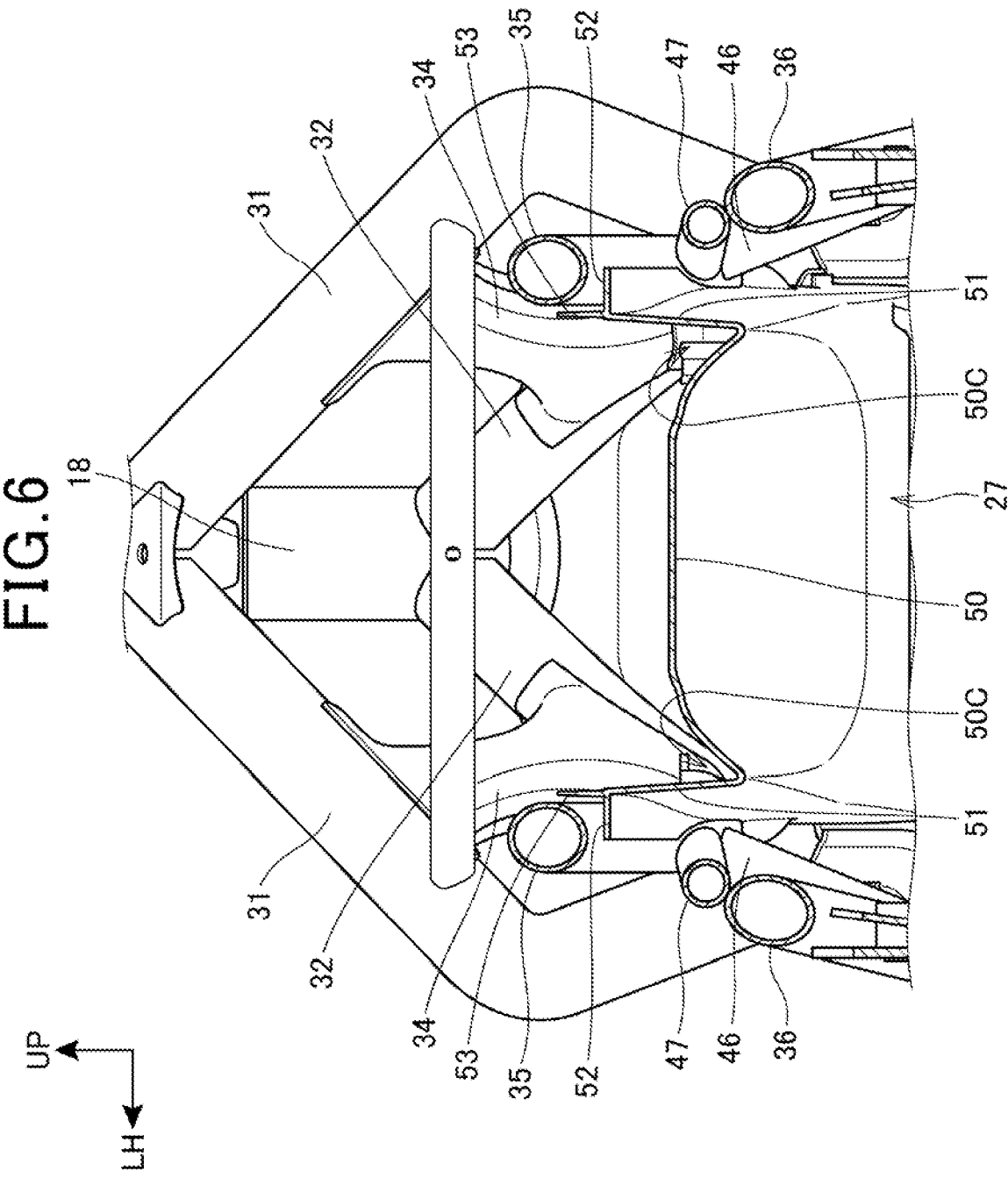
FIG. 6 is a cross-sectional view taken along a line VI-VI of FIG. 2.
Figure 7:
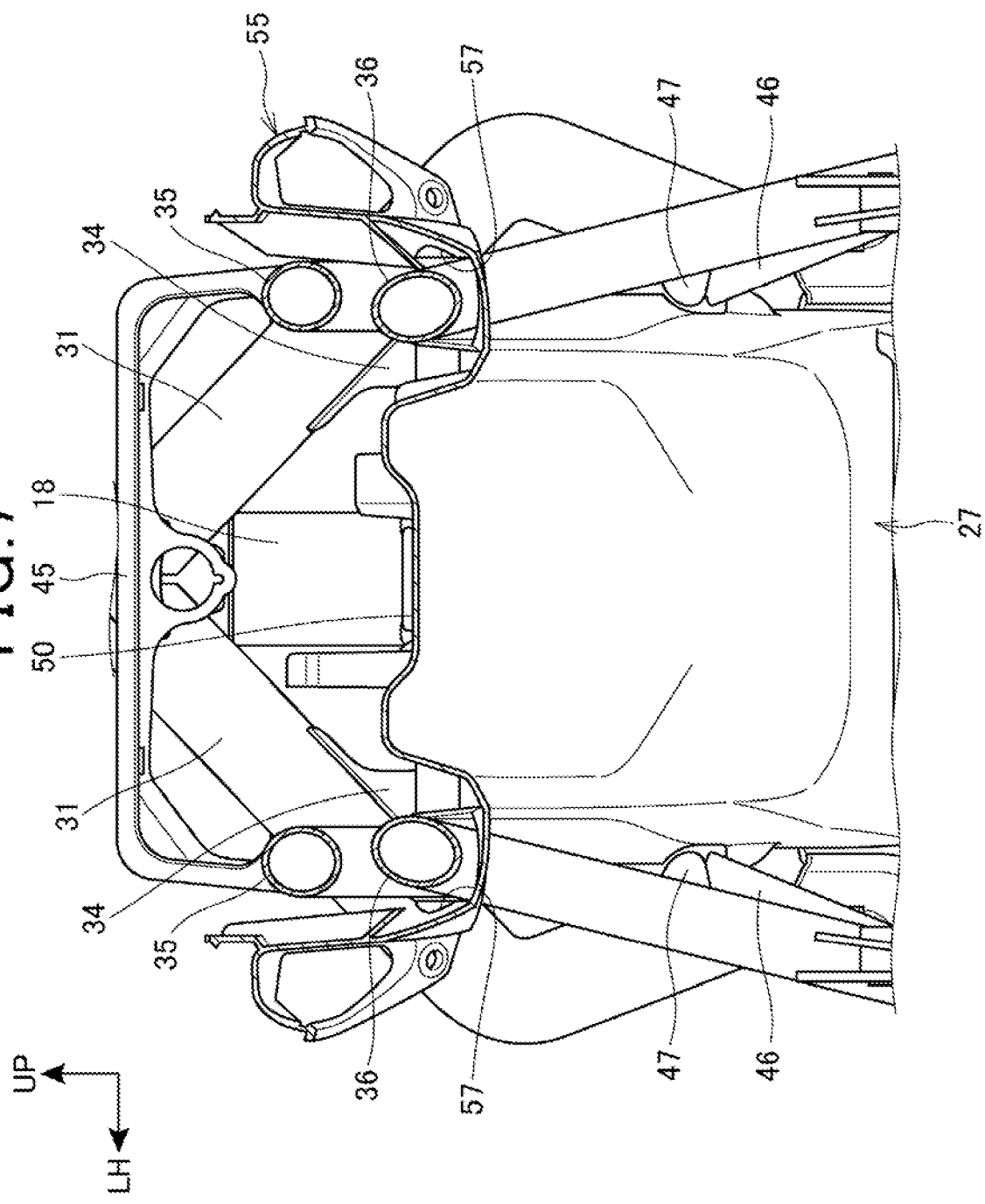
FIG. 7 is a cross-sectional view taken along a line VII-VII of FIG. 2.
Figure 8:
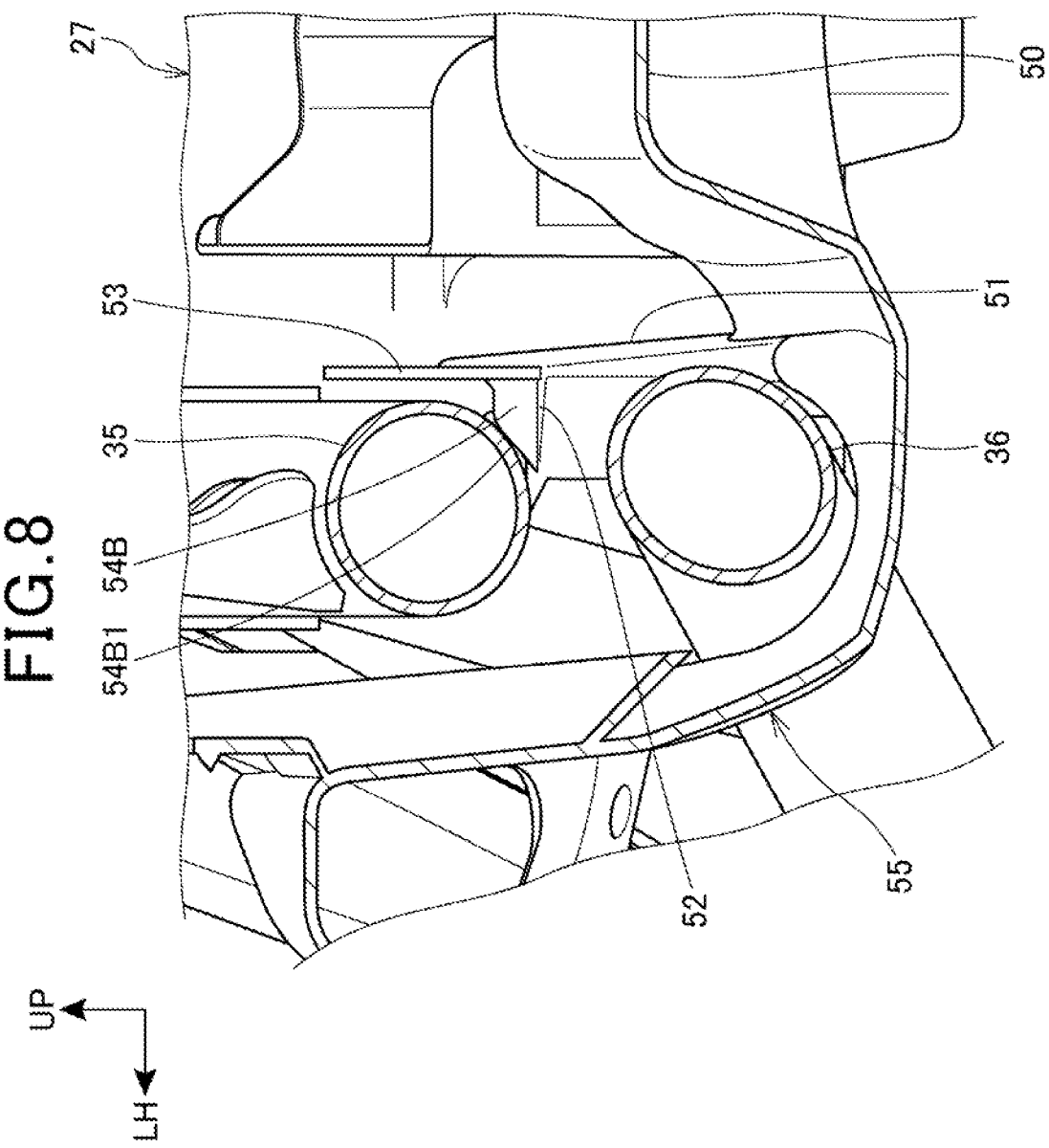
FIG. 8 is a diagram of a cross-sectional part of FIG. 7 as viewed in an axial direction of a seat frame.

FIG. 5 is a cross-sectional view taken along a line V-V of FIG. 2. FIG. 6 is a cross-sectional view taken along a line VI-VI of FIG. 2. FIG. 7 is a cross-sectional view taken along a line VII-VII of FIG. 2. FIG. 8 is a view of a cross-sectional part of FIG. 7 as viewed in an axial direction of a seat frame 35.

The left and right sides of the base portion 50 are provided with a pair of left and right vertical wall portions 51. Each of the vertical wall portions 51 extends upward from the upper surface of the base portion 50. The vertical wall portions 51 is formed in a part corresponding to the front end portion 35A and the intermediate portion 35B of the seat frame 35. The vertical wall portion 51 is disposed between the seat frame 35 and the sub-frame 36 in a side view of the vehicle, and extends in the front-rear direction along the seat frame 35 and the sub-frame 36.

In a plan view, each of the vertical wall portions 51 extend in parallel with the seat frame 35.

Specifically, the vertical wall portion 51 is disposed inside the seat frame 35 in the vehicle width direction on the intermediate portion 35B side of the seat frame 35, and extends in parallel with the seat frame 35. Further, on the front end portion 35A side of the seat frame 35, the vertical wall portion 51 slightly widens outward in the vehicle width direction from the intermediate portion 35B side, and extends in parallel with the seat frame 35 (see FIGS. 3 and 4).

In the front side of the bridge portion 45, at the same position in the front-rear direction, for example, at the position P1 of the intermediate portions 35B of the seat frames 35, the separation distance W13 in the vehicle width direction of the pair of left and right vertical wall portions 51 is set smaller than the separation distance W12 in the vehicle width direction of the pair of left and right sub-frames 36.

The base portion 50 and the vertical wall portion 51 form a housing space S0 (see FIG. 3) for the vehicle body components 60-62 on the upper surface of the base portion 50.

Specifically, the front portion of the upper surface of the base portion 50 forms a battery housing portion 50A. The battery housing portion 50A is provided at a position overlapping the pivot frames 33 in the front-rear direction. The battery 60 is housed in the battery housing portion 50A.

An electrical component housing portion 50B is formed on the rear side of the battery housing portion 50A. The electrical component housing portion 50B is provided on the front side of the bridge portion 45. The electrical component housing portion 50B houses an ECU (Electronic Control Unit) 61 and other electrical components 62.

As shown in FIGS. 5 and 6, both left and right sides of the electrical component housing portion 50B are recessed, and the base portion 50 is provided with a groove portions 50C extending in the front-rear direction. In the groove portions 50C, there is disposed cables and so on (not shown), which electrically connect components including the battery 60, the ECU 61, and the electrical components 62.

As shown in FIGS. 5 to 8, at the upper end of each of the vertical wall portions 51, an eaves portion 52 is formed and it extends outward in the vehicle width direction. The eaves portion 52 fills the gap between the vertical wall portion 51 and the seat frame 35. The eaves portion 52 has a long plate shape extending in the front-rear direction. The eaves portion 52 overlaps with the seat frame 35 in the up-down direction. In the present embodiment, the eaves portion 52 is located on the lower side of the seat frame 35 and overlaps the seat frame 35 in a plan view (see FIG. 3). The eaves portion 52 is provided close to the seat frame 35 and along the lower surface of the seat frame 35 in a side view of the vehicle. The eaves portion 52 makes it unlikely that the gap, which penetrates in the up-down direction between the vertical wall portion 51 and the seat frame 35, is exposed to the outside of the vehicle body. This improves appearance as viewed from the up-down direction. Further, this improves waterproof property of the housing space so against water that tries to enter from below.

Above each of the vertical wall portions 51, an extending wall portion 53 is formed. The extending wall portion 53 is a wall extending above the eaves portion 52. In the present embodiment, the extending wall portion 53 has an extended shape extending above the vertical wall portion 51. The extending wall portion 53 is located inside in the vehicle width direction with respect to the inner side surface of the seat frame 35 in the vehicle width direction. The extending wall portion 53 overlaps with the seat frame 35 in a side view of the vehicle (see FIG. 2). In the present embodiment, the extending wall portion 53 is formed on the rear side of the connection position between the seat frame 35 and the rear side connection frame 47. A part of the seat frame 35 is fitted in the space surrounded by the L-shape formed by the extending wall portion 53 and the eaves portion 52 (see FIG. 6). Therefore, the extending wall portion 53, the eaves portion 52, and the seat frame 35 make it unlikely that the through-hole-shaped gap, which is formed between the rear frame 20 and the rear fender 27, is exposed to the outside of the vehicle body.

On the upper surface of each of the eaves portions 52, there is provided a guide portion 54 whose height decreases toward the outside in the vehicle width direction. The guide portion 54 is provided at a position where the eaves portion 52 overlaps with the sub-frame 36 in a plan view (see FIG. 3). In the present embodiment, the guide portion 54 is formed from two (plural) ribs 54A and 54B separated in the front-rear direction. The rib 54A has an inclined surface 54A1 and the rib 54B has an inclined surface 54B1 in which each surface inclines downward toward the outside in the vehicle width direction (see FIG. 5). Each of the inclined surfaces 54A1 and 54B1 are provided at the outer end of the eaves portion 52 in the vehicle width direction in a plan view. Each of the ribs 54A and 54B of the present embodiment are provided so as to extend beyond an outer end of the sub-frame 36 in the vehicle width direction in a plan view. The guide portion 54 is provided so as to extend over the eaves portion 52 and the extending wall portion 53. In the present embodiment, of the ribs 54A and 54B, the rear side rib 54B is provided so as to extend over the eaves portion 52 and the extending wall portion 53 (see FIG. 5). As a result, the strength of the rib 54B on the rear side is enhanced by the eaves portion 52 and the extending wall portion 53, and the rib 54B on the rear side contributes to the rigidity of the eaves portion 52 and the extending wall portion 53.

A rear cowl portion (decorative surface) 55 is integrally formed on the rear side of the base portion 50. The rear cowl portion 55 is formed to have a larger left-right width than the base portion 50. The rear cowl portion 55 extends outward in the vehicle width direction of the sub-frames 36 on the lower side of the sub-frames 36, and further extends upward so as to cover the outer surfaces of the sub-frames 36 and the seat frames 35 in the vehicle width direction. Specifically, the rear cowl portion 55 is bent upward on its left and right lateral sides. Further, the rear side of the rear cowl portion 55 is bent upward on the rear side with respect to the sub-frames 36.

In the present embodiment, since the base portion 50 forming the housing space S0 is assembled from the lower side, the rear cowl portion 55 for covering the sub-frames 36 from the lower side can be integrally provided with the base portion 50.

The connection portion between the base portion 50 and the rear cowl portion 55 is provided with cutouts 57 that are cut out so as to be bent rearward and downward. On each of the cutouts 57, the sub-frame 36 is disposed (see FIG. 7).

Figure 9:
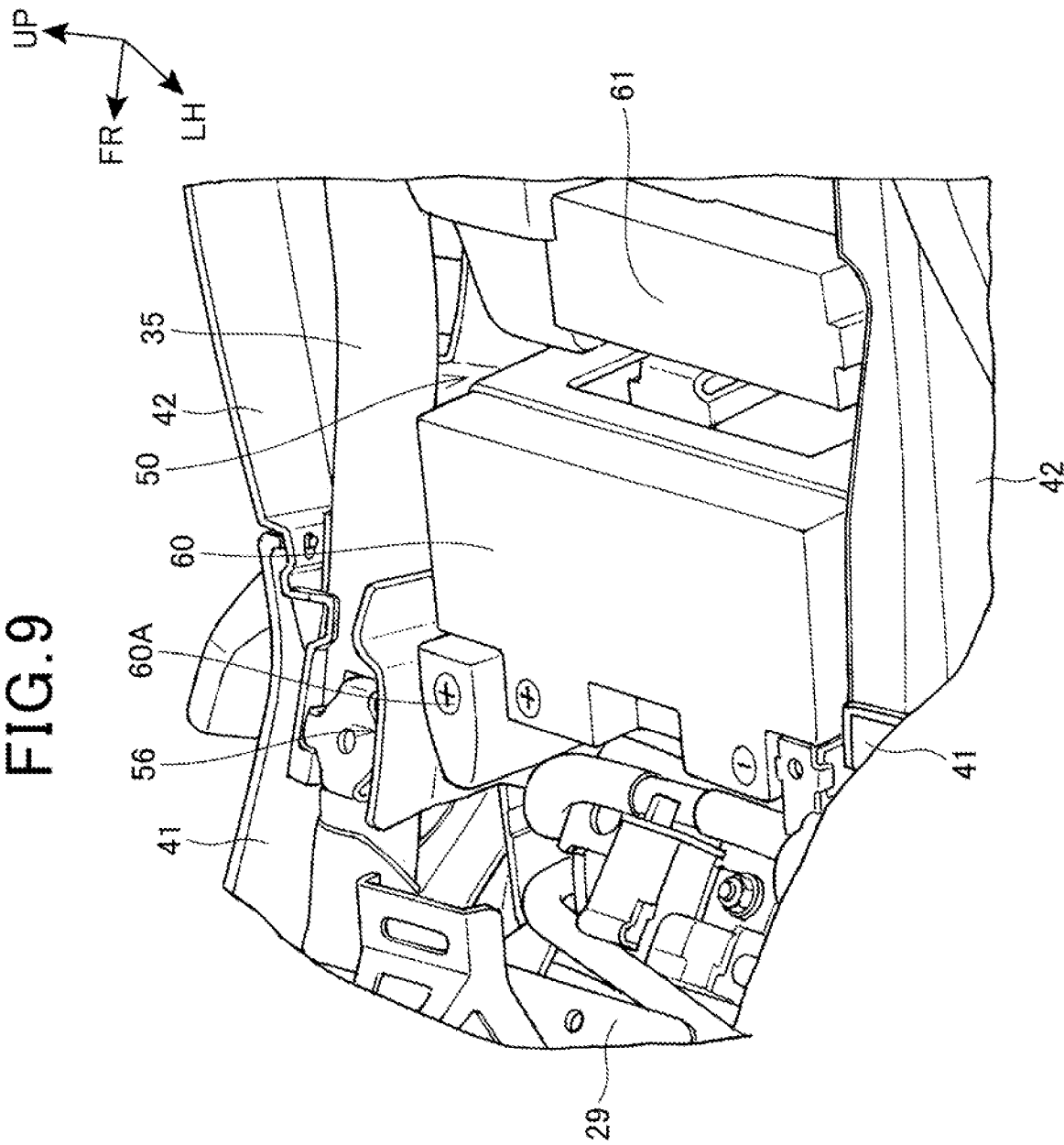
FIG. 9 is a perspective view of a front part of a base portion.
Figure 10:
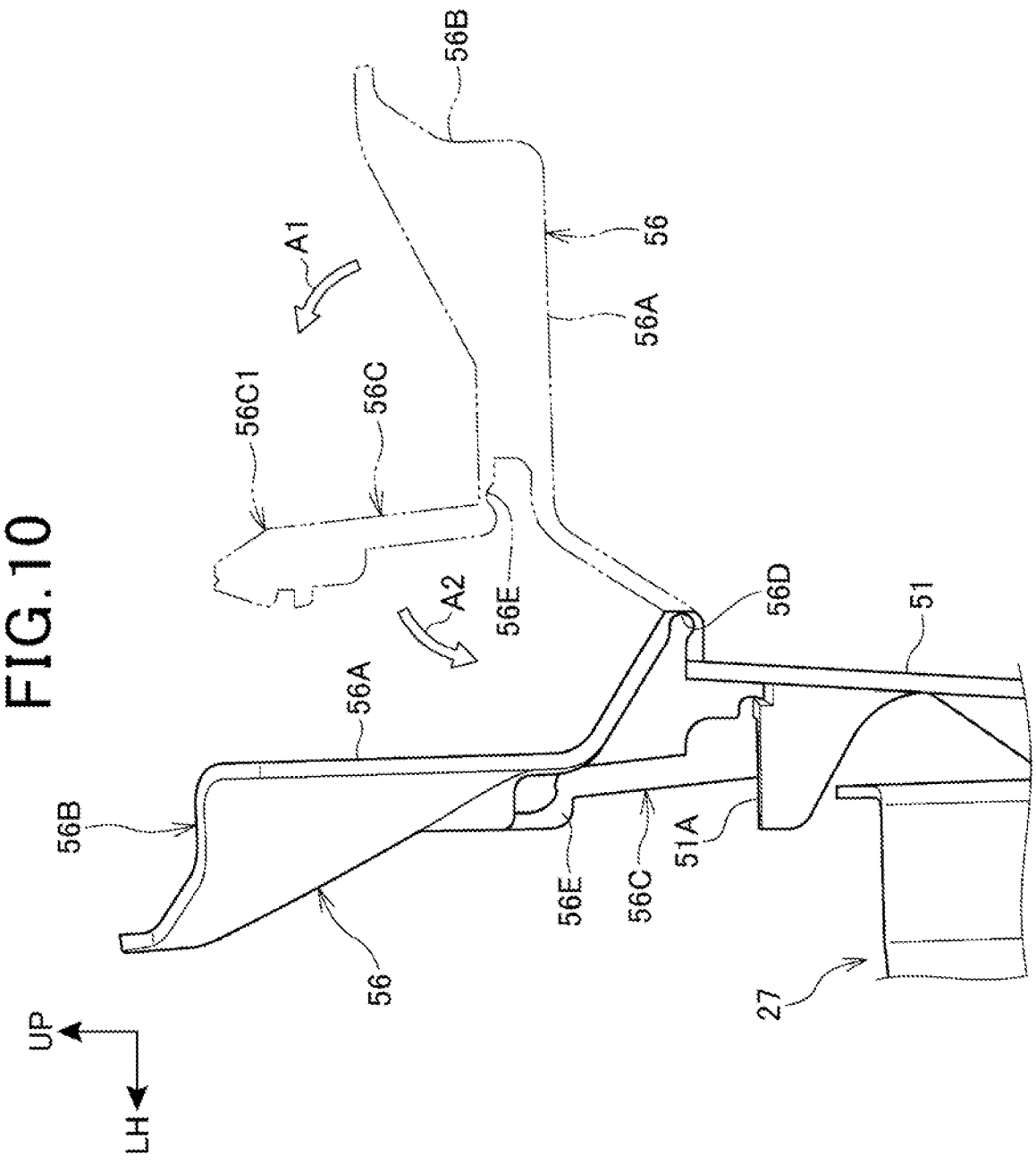
FIG. 10 is an explanatory diagram of a terminal guide.

FIG. 9 is a perspective view of the front part of the base portion 50. FIG. 10 is a diagram of a terminal guide 56 as viewed from the rear side.

The terminal guide 56 is formed on the front side of the base portion 50. The terminal guide 56 is a partition member that partitions the seat frame 35 and a terminal 60A of the battery 60 to prevent a tool (not shown) approaching the terminal 60A of the battery 60 from coming into contact with the seat frame 35.

Specifically, the terminal guide 56 is provided at the upper part of the vertical wall portion 51 on the right side. The terminal guide 56 has a partition wall surface 56A extending in the up-down direction. On the upper side of the partition wall surface 56A, there is formed a frame fitting surface 56B that is recessed inward in the vehicle width direction and extends upward. The terminal guide 56 has the partition wall surface 56A disposed on the right side of the battery 60, and the seat frame 35 on the right side is fitted in the frame housing surface 56B. As a result, the terminal 60A of the battery 60 and the seat frame 35 are separated from each other. A support portion 56C is formed on the lower side of the frame fitting surface 56B.

Here, the rear fender 27 is a resin molded product, and the terminal guide 56 is molded along the base portion 50 (see FIG. 4). The terminal guide 56 is assembled when the rear fender 27 is assembled to the vehicle body frame 11. In FIG. 10, the terminal guide 56 at the time of resin molding is shown by a dashed and double-dotted line. The terminal guide 56 is connected to the vertical wall portion 51 via a first resin hinge 56D. The terminal guide 56 has a support portion 56C connected thereto via a second resin hinge 56E. An end of the support portion 56C is provided with an insertion portion 56C1. The resin hinges 56D and 56E are portions whose thickness are reduced, and the vertical wall portion 51 and the support portion 56C are turnable around the resin hinges 56D and 56E.

The terminal guide 56 is turned around the first resin hinge 56D as shown by an arrow A1. Further, the support portion 56C is turned around the second resin hinge 56E as shown by an arrow A2. By inserting the insertion portion 56C1 into a hole portion 51A formed in the vertical wall portion 51, the terminal guide 56 is held upright along the extension direction of the vertical wall portion 51. Thus, the terminal guide 56 is assembled.

Figure 11:
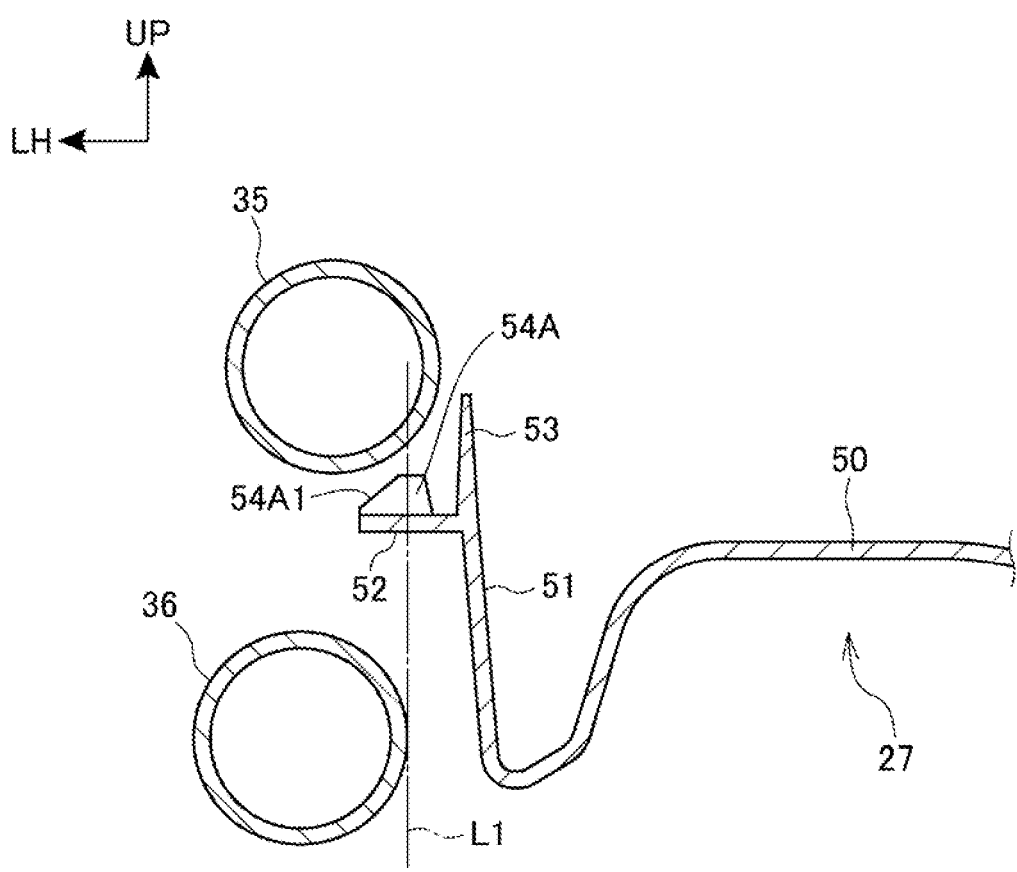
FIG. 11 is a cross-sectional view of a main part corresponding to an XI-XI line portion of FIG. 2.

FIG. 11 is a cross-sectional view of a main part corresponding to an XI-XI line portion of FIG. 2.

The next describes an example of how to attach the rear fender 27.

The front end of the rear fender 27 is engaged with the vehicle body frame 11, and the rear cowl portion 55 side thereof is turned upward using the front end side of the rear fender 27 as a fulcrum. As a result, each of the extending wall portions 53 enters the inside of the seat frame 35 in the vehicle width direction, and each of the eaves portions 52 moves across the sub-frame 36 from the lower side to the upper side and is disposed on the lower surface of the seat frame 35. Further, the rear cowl portion 55 covers the seat frames 35 and the sub-frames 36 from the lower side.

Generally, since the housing space S0 is accessed from the upper side, the left and right seat frames 35 above forms an opening for the housing space S0. Therefore, the separation distance W13 in the left-right direction of the vertical wall portions 51 is set corresponding to the separation distance W11 of the left and right seat frames 35.

Here, in the present embodiment, each of the eaves portion 52 extending outward in the vehicle width direction is provided at the upper end of the vertical wall portion 51. At some of the positions, the eaves portion 52 extends outward in the vehicle width direction with respect to an inner end L1 of the sub-frame 36, as shown in FIG. 11. However, in the present embodiment, the guide portion 54 is provided. Therefore, when the rear fender 27 is moved upward, the guide portion 54 comes into contact with the sub-frame 36, so that the vertical wall portion 51 and the like can be elastically deformed inward in the vehicle width direction. This can move the eaves portion 52 away to the inside of the vehicle width, and easily move the eaves portion 52 over the sub-frame 36 to the upper side with respect to the sub-frame 36. This makes assembly of the rear fender 27 better.

When the rear fender 27 is attached to the rear frame 20, rear side covers 42 are attached to the rear frame 20. The rear side covers 42 extend along the lower side of the seat 17 and cover the seat frames 35 from the outside in the vehicle width direction. The rear side covers 42 of the present embodiment cover the upper part of the rear fender 27, which are the eaves portions 52 and the extending wall portions 53, from the outside in the vehicle width direction. On the other hand, the lower part of the rear fender 27, which are the base portion 50 and the vertical wall portions 51, is exposed to the outside in the vehicle width direction. This makes it possible to expose the flat surfaces of the base portion 50 and the vertical wall portion 51 in appearance to improve appearance easily.

The upper side of the housing space S0 is covered with the seat 17, and the left and right sides thereof are covered with the rear side covers 42 and the vertical wall portions 51. Here, parts between the rear side covers 42 and the rear fender 27 can be accessed from below, and water can enter from below. However, the rear fender 27 of the present embodiment does not have any gap penetrating in the up-down direction created, because of the vertical wall portions 51, the eaves portions 52, the extending wall portions 53, and the seat frames 35. This easily prevent water from below, and improves waterproof property of the housing space S0.

Figure 12:
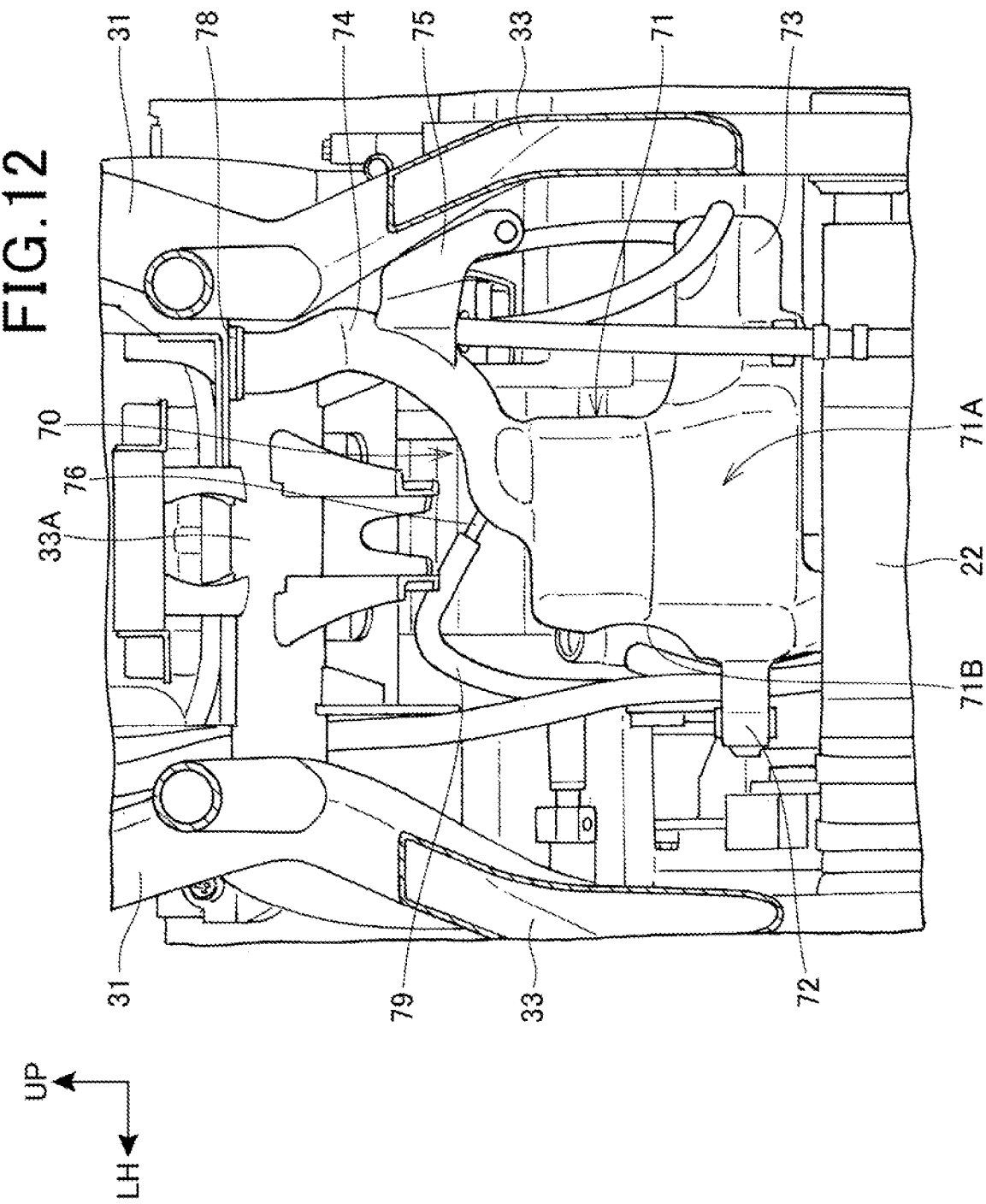
FIG. 12 is a vertical cross-sectional view of a saddle-ride vehicle, along a left-right direction, showing a rear surface of a reserve tank.
Figure 13:
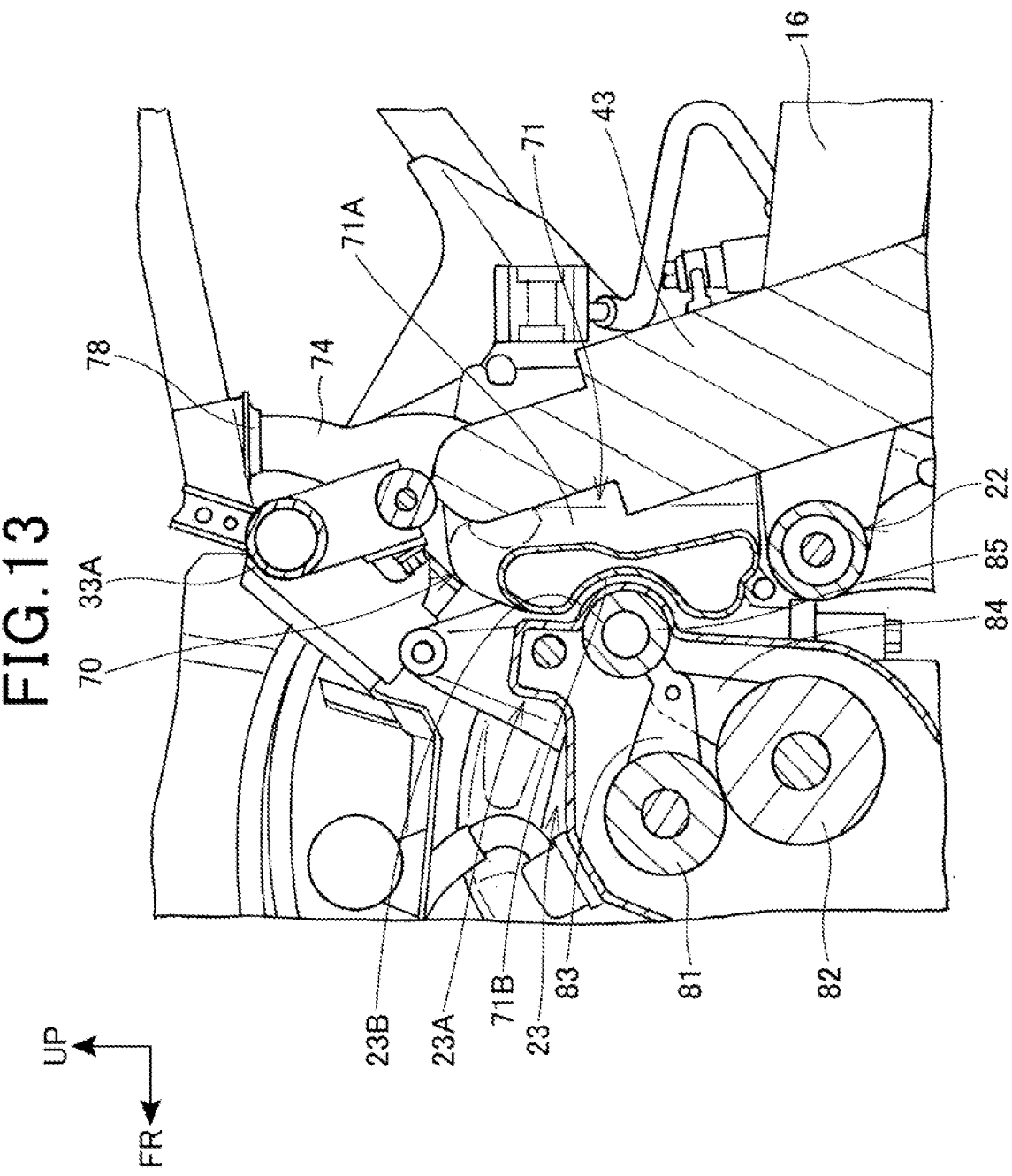
FIG. 13 is a vertical cross-sectional view of a saddle-ride vehicle, along a front-rear direction, showing a periphery of the reserve tank.

FIG. 12 is a vertical cross-sectional view of the saddle-ride vehicle 10 showing the rear surface of a reserve tank 70 along the left-right direction. FIG. 13 is a vertical cross-sectional view of the saddle-ride vehicle 10 showing the periphery of the reserve tank 70 along the front-rear direction.

The reserve tank 70 stores the cooling water of the radiator 37 (see FIG. 1). The reserve tank 70 is disposed on the lower side of the radiator 37. In the present embodiment, the reserve tank 70 is disposed on the upper side of the pivot shaft 22. The reserve tank 70 is disposed between the left and right pivot frames 33. The reserve tank 70 is disposed between the crankcase 23 and a rear cushion 43.

The crankcase 23 is provided with a transmission case 23A at the rear part. The transmission case 23A houses a plurality of drive gears 81, a plurality of driven gears 82, a plurality of shift forks 83, 84, and a shift drum 85 engaged with the shift forks 83 and 84. The shift drum 85 is disposed at the upper part on the rear side with respect to the drive gears 81, the driven gears 82, and the shift forks 83 and 84. The transmission case 23A projects rearward according to the housing position of the shift drum 85. The transmission case 23A is provided with a projecting portion 23B in which the shift drum 85 is fitted.

The rear cushion 43 suspends the swing arm 16 on the vehicle body frame 11. The rear cushion 43 is disposed at the central part in the vehicle width direction. The upper end portion of the rear cushion 43 is connected to the central part of a cross member 33A in the vehicle width direction. The cross member 33A connects the upper parts of the left and right pivot frames 33 in the vehicle width direction. The lower end portion of the rear cushion 43 is connected to the swing arm 16 via a link mechanism 44 (see FIG. 1).

Figure 14:
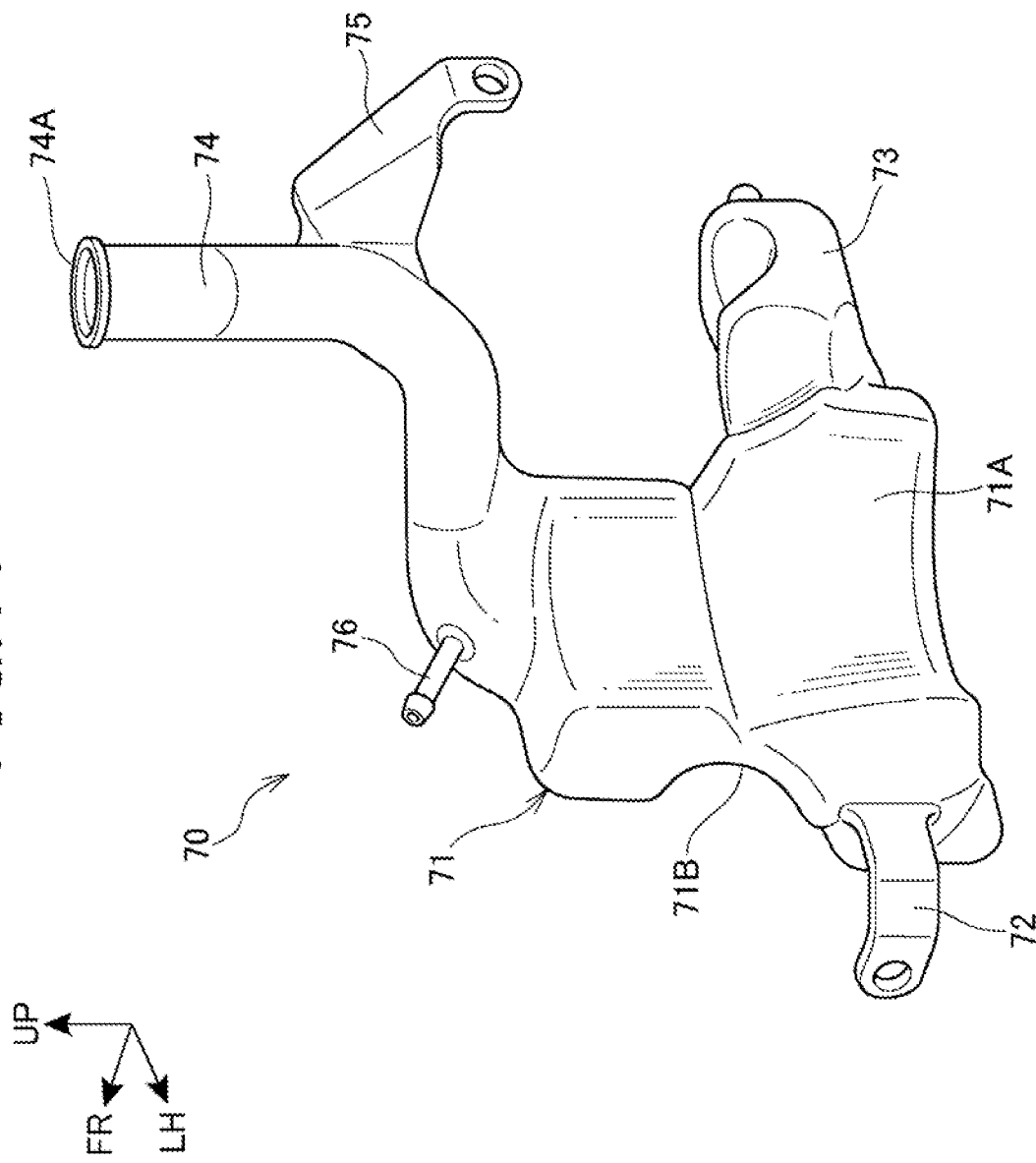
FIG. 14 is a perspective view of the reserve tank.

FIG. 14 is a perspective view of the reserve tank 70.

The reserve tank 70 of the present embodiment is an integrated product made of resin.

The reserve tank 70 has a tank body portion 71 extending in the up-down direction. The tank body portion 71 is hollow and stores cooling water. A vertical recessed portion 71A extending in the up-down direction is formed on the rear surface of the tank body portion 71. In the vertical recessed portion 71A, the rear cushion 43, which extends in the up-down direction, is fitted from the rear side (see FIG. 13).

A horizontal recessed portion 71B extending in the vehicle width direction is formed on the front surface of the tank body portion 71. In the horizontal recessed portion 71B, the projecting portion 23B of the crankcase 23, which extends in the vehicle width direction, is fitted from the front side. The reserve tank 70 is disposed close to the crankcase 23 and the rear cushion 43 by the vertical recessed portion 71A and the horizontal recessed portion 71B.

A tank connection portion 73 is formed on the lower right side of the tank body portion 71. The tank connection portion 73 is connected to a cooling water hose extending to the radiator 37.

A water supply pipe portion 74 extending upward is formed on the upper right side of the tank body portion 71. The water supply pipe portion 74 extends upward along one of the pivot frames 33 (see FIG. 12). A water supply port 74A opening upward is formed at the upper end of the water supply pipe portion 74. The water supply port 74A opens on the rear side of the cross member 33A. The water supply port 74A is closed by a cap 78 (see FIG. 12). The cap 78 is detachably attached to the water supply port 74A. Cooling water can be supplied into the reserve tank 70 through the water supply port 74A.

The water supply pipe portion 74 is provided with an atmospheric open pipe portion 76 that allows the inside of the water supply pipe portion 74 to communicate with the atmosphere. The atmospheric open pipe portion 76 has an atmospheric open hose 79 connected thereto.

The reserve tank 70 is attached to the crankcase 23 and the vehicle body frame 11 by the attaching portions 72 and 75. Further, these attaching portions 72 and 75 hold vehicle body components such as pipes and harnesses.

When the temperature of the cooling water in the radiator 37 rises and the volume of the cooling water expands, a part of the cooling water flows to the reserve tank 70 through the cooling water hose and is stored in the reserve tank 70.

When the temperature of the cooling water in the radiator 37 drops and the pressure inside the radiator 37 becomes negative, the cooling water in the reserve tank 70 returns into the radiator 37 through the cooling water hose.

As described above, according to the present embodiment to which the present invention is applied, the saddle-ride vehicle 10 has: a pair of left and right seat frames 35; a pair of left and right sub-frames 36 for respectively supporting the pair of left and right seat frames 35; and a rear fender 27 assembled from the lower side of the vehicle body. Further, the rear fender 27 has: a base portion 50 located on the upper side of the rear wheel 15; and a pair of left and right vertical wall portions 51 extending upward from the base portion 50. Additionally, the saddle-ride vehicle 10 has a housing space S0 for vehicle body components 60, 61, and 62, which is formed by the upper surface of the base portion 50. In this saddle-ride vehicle 10, the separation distance W13 of the pair of left and right vertical wall portions 51 is set smaller than the separation distance W12 of the pair of left and right sub-frames 36; the upper parts of the pair of left and right vertical wall portions 51 are each provided with an eaves portion 52, extending outward in the vehicle width direction, for filling the gap between the vertical wall portion 51 and each of the frames 35 and 36; each of the eaves portions 52 overlaps with the seat frame 35 in the up-down direction; and the upper surface of the eaves portion 52 has a guide portion 54 whose height decreases toward the outside in the vehicle width direction.

This configuration makes it possible to provide a saddle-ride vehicle 10 capable of improving appearance and waterproof property when the vertical wall portions 51 of the rear fender 27 each have a gap between the seat frame 35 or the sub-frame 36.

In the present embodiment, each of the guide portions 54 includes a plurality of ribs 54A and 54B, and is provided at a position where the eaves portion 52 overlaps with the sub-frame 36 in a plan view.

This configuration allows each of the guide portions 54 to come into contact with the sub-frame 36 to elastically deform the rear fender 27 when the rear fender 27 is assembled from the lower side. Therefore, the eaves portion 52 can be assembled while being moved away from the sub-frame 36, allowing the rear fender 27 to be assembled easily.

Further, in the present embodiment, there is a part in which the separation distance W22 of the pair of left and right sub-frames 36 is smaller than the separation distance W21 of the pair of left and right seat frames 35; the vertical wall portions 51 extend in parallel with the seat frames 35; and the eaves portions 52 are located on the lower side of the seat frames 35 and overlap the seat frames 35 in a plan view.

According to this configuration, the vertical wall portions 51 are parallel to the seat frames 35, which can widen the width of the housing space S0 to facilitate access to the housing space S0 and to improve appearance and waterproof property at the same time.

Further, in the present embodiment, each of the eaves portions 52 is provided along the lower surface of the seat frame 35 in a side view of the vehicle, and the rear side cover 42 covering the side of the seat frame 35 covers the eaves portion 52.

According to this configuration, the eaves portion 52 and the seat frame 35 can be brought close to each other, and the gap generated between the eaves portion 52 and the seat frame 35 is covered with the rear side cover 42. This makes it possible to improve appearance and waterproof property.

Further, in the present embodiment, at the rear part of the rear fender 27, there is a rear cowl portion 55 that: extends outward in the vehicle width direction of the sub-frames 36, on the lower side of the sub-frames 36; and further extends upward so as to cover the outer surfaces of the sub-frames 36 and the seat frames 35 in the vehicle width direction.

According to this configuration, the rear fender 27 assembled from the lower side of the vehicle body has a cover shape that covers the sub-frames 36 and the seat frames 35 from the lower side. This makes it possible to reduce the number of parts.

Further, in the present embodiment, each of the vertical wall portion 51 has an extending wall portion 53 extending upward from the eaves portion 52, and the extending wall portion 53 is located on the inner side in the vehicle width direction with respect to the inner side surface of the seat frame 35 in the vehicle width direction.

This configuration makes it possible to improve waterproof property. In particular, a double wall structure of the eaves portion 52 and the extending wall portion 53 is likely to be formed from the lower side of the rear fender 27 toward the housing space S0, making it possible to improve waterproof property.

Further, in the present embodiment, the guide portion 54 is provided so as to extend over the eaves portion 52 and the extending wall portion 53.

According to this configuration, since the guide portion 54 is supported on two sides, the strength of the guide portion 54 can be improved.

Other Embodiments

The above-described embodiment shows only one aspect of the present invention, and can be modified and applied in any manner without departing from the gist of the present invention.

The above embodiment describes a configuration such that, of the two ribs 54A and 54B of each of the guide portions 54, only the rear side rib 54B extends over the eaves portion 52 and the extending wall portion 53. However, the rib 54A on the front side may also extend over the eaves portion 52 and the extending wall portion 53.

In the above embodiment, each of the guide portions 54 is formed from two ribs 54A and 54B, but may be formed from three or more ribs.

The above embodiment describes a configuration such that each of the guide portions 54 is provided only in a part overlapping with the sub-frame 36 in a plan view, but a configuration may be such that the guide portion 54 is provided in a part that does not overlap with the sub-frame 36 in a plan view. Therefore, for example, the guide portion 54 may be provided at the front end portion of the eaves portion 52. As a result, for example, if the rear fender 27 would be assembled from the lower side in a state of being displaced in the vehicle width direction, the guide portion 54 can make it more unlikely that the eaves portion 52 receive a large force compared with a case in which the eaves portion 52 at the front end portion directly contacts the sub-frame 36.

The above embodiment illustrates a motorcycle having a front wheel 13 and a rear wheel 15 as a saddle-ride vehicle 10, but the present invention is not limited to this. The present invention is further applicable to a three-wheel saddle-ride vehicle having two front wheels or two rear wheels and a saddle-ride vehicle having four or more wheels.

Configurations Supported by the Above Embodiment

The above embodiment supports the following configurations.

Configuration 1

A saddle-ride vehicle, including: a pair of left and right seat rails; a pair of left and right sub-frames for respectively supporting the pair of left and right seat rails; and a rear fender assembled from a lower side of a vehicle body, the rear fender including a base portion located on an upper side of a rear wheel, the rear fender having a pair of left and right vertical wall portions extending upward from the base portion, an upper surface of the base portion forming a housing space for vehicle body components, wherein a separation distance of the pair of left and right vertical wall portions is set smaller than a separation distance of the pair of left and right sub-frames, and upper parts of the pair of left and right vertical wall portions are each provided with an eaves portion, extending outward in a vehicle width direction, for filling a gap between each of the vertical wall portions and each of the frames, the eaves portions overlap with the seat rails in an up-down direction, and upper surfaces of the eaves portions each have a guide portion whose height decreases outward in the vehicle width direction.

This configuration makes it possible to provide a saddle-ride vehicle capable of improving appearance and waterproof property when a gap is formed between each of the vertical wall portions of the rear fender and the seat rail or the sub-frame.

Configuration 2

The saddle-ride vehicle according to configuration 1, wherein each of the guide portions includes a plurality of ribs, and is provided at a position where the eaves portion overlaps with the sub-frame in a plan view.

According to this configuration, when the rear fender is assembled from the lower side, each of the guide portions comes into contact with the sub-frame and the rear fender can be elastically deformed. Therefore, the assembly can be performed while the eaves portion is away from the sub-frame, allowing the rear fender to be assembled easily.

Configuration 3

The saddle-ride vehicle according to configuration 2, further including a part in which a separation distance of the pair of left and right sub-frames is smaller than a separation distance of the pair of left and right seat rails, wherein the vertical wall portions extend in parallel with the seat rails, and the eaves portions are located on a lower side of the seat rails and respectively overlap with the seat rails in a plan view.

According to this configuration, the vertical wall portions are parallel to the seat rails, which can widen the housing space to facilitate access to the housing space and to improve appearance and waterproof property at the same time.

Configuration 4

The saddle-ride vehicle according to configuration 2 or 3, wherein the eaves portions are provided along lower surfaces of the seat rails in a side view of the vehicle, and cover members for covering sides of the seat rails cover the eaves portions.

According to this configuration, each of the eaves portions and each of the seat rails can be brought close to each other, and the gap created between the eaves portion and the seat rail is covered with the cover member. This makes it possible to improve appearance and waterproof property.

Configuration 5

The saddle-ride vehicle according to any of configurations 1 to 4, further including a decorative surface, the decorative surface extending outward in the vehicle width direction of the sub-frames on a lower side of the sub-frames at a rear part of the rear fender, the decorative surface further extending upward so as to cover outer surfaces of the sub-frames and the seat rails in the vehicle width direction.

According to this configuration, the rear fender assembled from the lower side of the vehicle body has a cover shape for covering the sub-frames and seat rails from the lower side, making it possible to reduce the number of parts.

Configuration 6

The saddle-ride vehicle according to any of configurations 1 to 5, wherein the vertical wall portions each have an extending wall portion extending upward from the eaves portion, and the extending wall portion is located inside in the vehicle width direction with respect to an inner side surface of the seat rail in the vehicle width direction.

This configuration makes it possible to improve waterproof property. In particular, a double wall structure of the eaves portion and the extending wall portion is likely to be formed from the lower side of the rear fender toward the housing space, making it possible to improve waterproof property.

Configuration 7

The saddle-ride vehicle according to configuration 6, wherein each of the guide portions is provided so as to extend over the eaves portion and the extending wall portion.

According to this configuration, since the guide portion is supported on two sides, the strength of the guide portion can be improved.

REFERENCE SIGNS LIST 10 saddle-ride vehicle
15 rear wheel
27 rear fender
35 seat frame (seat rail, frame)
36 sub-frame (frame)
42 rear side cover (cover member)
50 base portion
51 vertical wall portion
52 eaves portion
53 extending wall portion
54 guide portion
54A rib
54B rib
55 rear cowl portion (decorative surface)
60 vehicle body component
61 vehicle body component
62 vehicle body component
S0 housing space
W11 separation distance of seat rails
W12 separation distance of sub-frames
W13 separation distance of vertical wall portion
W21 separation distance of seat rails
W22 separation distance of sub-frames

What is claimed is:
1. A saddle-ride vehicle, comprising:
a pair of left and right seat rails;
a pair of left and right sub-frames for respectively supporting the pair of left and right seat rails; and
a rear fender assembled from a lower side of a vehicle body, the rear fender including a base portion located on an upper side of a rear wheel, the rear fender having a pair of left and right vertical wall portions extending upward from the base portion, an upper surface of the base portion forming a housing space for vehicle body components, wherein
a separation distance of the pair of left and right vertical wall portions is smaller than a separation distance of the pair of left and right sub-frames, and
upper parts of the pair of left and right vertical wall portions are each provided with an eaves portion, extending outward in a vehicle width direction, for filling a gap between each of the vertical wall portions and each of the seat rails or each of the sub-frames, the eaves portions overlap with the seat rails in an up-down direction, and upper surfaces of the eaves portions each have a guide portion whose height decreases outward in the vehicle width direction.
2. The saddle-ride vehicle according to claim 1,
wherein each of the guide portions includes a plurality of ribs, and is provided at a position where each of the eaves portions overlaps with each of the sub-frames in a plan view.
3. The saddle-ride vehicle according to claim 2, further comprising a part in which a separation distance of the pair of left and right sub-frames is smaller than a separation distance of the pair of left and right seat rails, wherein
  the vertical wall portions extend in parallel with the seat rails, and
  the eaves portions are located on a lower side of the seat rails and respectively overlap with the seat rails in a plan view.

4. The saddle-ride vehicle according to claim 2, wherein the eaves portions are provided along lower surfaces of the seat rails in a side view of the vehicle, and cover members for covering sides of the seat rails cover the eaves portions.

5. The saddle-ride vehicle according to claim 1, further comprising a decorative surface, the decorative surface extending outward in the vehicle width direction of the sub-frames on a lower side of the sub-frames at a rear part of the rear fender, the decorative surface further extending upward so as to cover outer surfaces of the sub-frames and the seat rails in the vehicle width direction.

6. The saddle-ride vehicle according to claim 1,
  wherein the vertical wall portions each have an extending wall portion extending upward from the eaves portion, and each extending wall portion is located inside in the vehicle width direction with respect to an inner side surface of each of the seat rails in the vehicle width direction.

7. The saddle-ride vehicle according to claim 6, wherein each of the guide portions is provided so as to extend over the eaves portion and the extending wall portion.

* * * * *